United States Patent
Chen

(10) Patent No.: US 10,165,858 B1
(45) Date of Patent: Jan. 1, 2019

(54) MULTI-RAIL CONCEALED SLIDE RAIL STRUCTURE

(71) Applicant: MARTAS PRECISION SLIDE CO., LTD., New Taipei (TW)

(72) Inventor: Wan-Lai Chen, New Taipei (TW)

(73) Assignee: Martas Precision Slide Co., Ltd., New Taipei (TW)

(*) Notice: Subject to any disclaimer, the term of this patent is extended or adjusted under 35 U.S.C. 154(b) by 0 days.

(21) Appl. No.: 15/709,630

(22) Filed: Sep. 20, 2017

(51) Int. Cl.
| | |
|---|---|
| A47B 88/04 | (2006.01) |
| A47B 88/00 | (2017.01) |
| A47B 88/437 | (2017.01) |
| F16C 29/00 | (2006.01) |
| A47B 88/493 | (2017.01) |
| A47B 88/487 | (2017.01) |
| F16C 29/04 | (2006.01) |

(52) U.S. Cl.
CPC .......... *A47B 88/437* (2017.01); *A47B 88/487* (2017.01); *A47B 88/493* (2017.01); *F16C 29/008* (2013.01); *F16C 29/048* (2013.01); *F16C 2314/72* (2013.01)

(58) Field of Classification Search
CPC ..... A47B 88/437; A47B 88/487; A47B 88/40; A47B 88/493
See application file for complete search history.

(56) References Cited

U.S. PATENT DOCUMENTS

| | | | | |
|---|---|---|---|---|
| 8,152,252 B2* | 4/2012 | Liang | ................... | A47B 88/493 |
| | | | | 312/334.6 |
| 8,678,529 B2* | 3/2014 | Li | .......... | A47B 88/40 |
| | | | | 312/334.37 |
| 8,833,880 B2* | 9/2014 | Chung | ................. | A47B 88/493 |
| | | | | 312/334.11 |
| 9,144,307 B1* | 9/2015 | Chen | ................... | A47B 88/0466 |
| 9,498,061 B2* | 11/2016 | Liang | ................... | A47B 88/487 |
| 9,596,932 B2* | 3/2017 | Greussing | ............ | A47B 88/487 |
| 9,642,462 B2* | 5/2017 | Violand | ................ | F16C 29/005 |
| 9,784,314 B2* | 10/2017 | Ng | ........................ | F16C 29/005 |
| 9,961,999 B1* | 5/2018 | Su | ........................ | A47B 88/493 |
| 9,993,077 B2* | 6/2018 | Chen | ..................... | A47B 88/493 |
| 2004/0212283 A1* | 10/2004 | Gasser | ................. | A47B 88/467 |
| | | | | 312/333 |
| 2005/0231083 A1* | 10/2005 | Garcie, Jr. | ........... | A47B 88/467 |
| | | | | 312/333 |
| 2009/0238503 A1* | 9/2009 | Liang | ................... | A47B 88/493 |
| | | | | 384/18 |
| 2011/0188788 A1* | 8/2011 | Li | .......................... | A47B 88/40 |
| | | | | 384/19 |

(Continued)

*Primary Examiner* — Kimberley S Wright
(74) *Attorney, Agent, or Firm* — Rosenberg, Klein & Lee

(57) ABSTRACT

A multi-rail concealed slide rail structure includes an outer rail, a first ball retainer, a middle rail, a pair of second ball retainers, and an inner rail. One side of the outer rail is bent inward to form a first track for the first ball retainer to slide thereon. Two side edges of the middle rail are bent in the same direction to form second tracks, respectively. The middle rail is fitted on the first ball retainer, such that the first ball retainer leans against one of the second tracks. The pair of second ball retainers is movably fitted on the middle rail. One side edge of the inner rail is bent inward to form a third track corresponding to the second tracks. The inner rail is fitted on the pair of second ball retainers. Two parallel tracks are provided between the inner rail and the middle rail.

6 Claims, 5 Drawing Sheets

(56) References Cited

U.S. PATENT DOCUMENTS

| | | | |
|---|---|---|---|
| 2013/0076221 A1* | 3/2013 | Hammerle | A47B 88/14 |
| | | | 312/334.1 |
| 2014/0241651 A1* | 8/2014 | Greussing | A47B 88/487 |
| | | | 384/19 |
| 2015/0257536 A1* | 9/2015 | Chen | A47B 88/0466 |
| | | | 384/18 |
| 2016/0128472 A1* | 5/2016 | Ng | F16C 29/005 |
| | | | 384/18 |
| 2016/0235198 A1* | 8/2016 | Liang | A47B 88/14 |
| 2016/0242545 A1* | 8/2016 | Violand | F16C 29/005 |

\* cited by examiner

MULTI-RAIL CONCEALED SLIDE RAIL STRUCTURE

FIELD OF INVENTION

The present invention relates to an auxiliary slide device for furniture, and more particularly to a multi-rail concealed slide rail structure mounted between the bottom of a drawer and a furniture body. Two parallel tracks are provided between an outer rail and a middle rail to enhance the support effect when the rails are pulled outward.

BACKGROUND OF INVENTION

1. Description of the Related Art

In general, filing cabinets, cabinets, tables and other furniture are provided with a slide rail assembly between a drawer and the furniture so that the drawer can be pulled smoothly. The interior of the slide rail assembly is provided with rolling components, such as slidable steel balls or steel rollers, for the drawer to be pulled with ease. For the aesthetic needs, there are various undermount slide rail assemblies on the market. The undermount slide rail assembly is mounted under the bottom of a drawer to be connected with the furniture. When the drawer is pulled out, the slide rail assembly won't appear at both sides of the drawer, so the undermount slide rail assembly is also known as a concealed slide rail assembly.

When the drawer with the concealed slide rail assembly is pulled outward, the weight of the drawer directly applies a force to the slide rail assembly. The direction of the applied force is different from that of a side mount slide rail assembly, and its structure is usually more firm than the side mount slide rail assembly. The concealed slide rail assembly has a rectangular cross section. The side mount slide rail assembly has an elongated flat cross section. Their designs are significantly different. The concealed slide rail assembly is able to withstand more weight in the vertical direction. The rolling components of the concealed slide rail assembly are different from those of the side mount slide assembly. Not all of the rolling components are spherical rolling balls. The concealed slide rail assembly uses rollers as its main rolling components. The rollers provide a larger contact area between the rails when they are moved. When the rails are pulled outward, the stability of the relative movement of the slide rail components can be enhanced.

However, the concealed slide rail assemblies are arranged in pairs and usually mounted to the bottom surface close to two sides of the drawer to form two parallel moving tracks, and appropriate rolling elements are provided to support its sliding. The weight of the drawer is only supported by the two parallel moving tracks. Such a design is liable to cause a shaking or deviation, and the rolling elements suffer a lot of wear and tear to affect the use. Accordingly, the inventor of the present invention has devoted himself based on his many years of practical experiences to solve these problems.

2. Summary of the Invention

In view of this, the primary object of the present invention is to provide a multi-rail concealed slide rail structure. Two parallel tracks are provided between an inner rail and a middle rail. When the two rails are pulled outward for use, the two parallel tracks enhance the support effect of the sides of the original tracks and provide better covering force to improve the stability of the use greatly, and the rails can be pulled smoothly for use. Besides, the inner rail of the present invention covers the second ball retainers to form a complete covering to enhance the protective effect after assembly.

In order to achieve the aforesaid object, the multi-rail concealed slide rail structure of the present invention comprises an outer rail, a first ball retainer, a middle rail, a pair of second ball retainers, and an inner rail. The outer rail is an elongated structure having an L-shaped cross section. One side of the outer rail is mounted to a retaining surface. Another side of the outer rail is bent inward to form a first track. The first ball retainer includes a first holder which is formed in a G-like shape corresponding to the first track. A plurality of first rollers are provided each surface of the first holder. The first ball retainer is fitted on the first track, such that the first rollers of the top surface, the bottom surface and the two side surfaces of the first ball retainer lean against four surfaces of the first track. The middle rail is an elongated structure having a reverse U-shaped cross section corresponding to the first ball retainer. Two side edges of the middle rail are bent in the same direction to form second tracks, respectively. The middle rail is fitted on the first ball retainer. The first rollers on the bottom surface of the first ball retainer lean against one of the second tracks. A central portion and two side surfaces of the middle rail lean against the first rollers on the top surface and the two side surfaces of the first ball retainer, respectively. Each of the second ball retainers includes a second holder which is formed in a reverse U-like shape corresponding to the middle rail. A plurality of second rollers and balls are provided on each surface of the second holder. The pair of second ball retainers is located corresponding to a front section and a rear section of the middle rail, respectively. The second rollers of the second holder lean against two side surfaces and a top surface of the middle rail, respectively. The inner rail is an elongated structure having a reverse U-shaped cross section corresponding to the pair of second ball retainers. Two side edges of the inner rail are bent inward to form third tracks corresponding to the second tracks, respectively. The inner rail is provided with a reversed bent portion corresponding to the pair of second ball retainers. The inner rail is fitted on the pair of second ball retainers. A top surface and two side surfaces of the inner rail lean against the second rollers on a top surface and two side surfaces of the pair of second ball retainers, respectively. The second balls at respective bottom surfaces of the pair of second ball retainers are sandwiched between the second tracks and the third tracks.

In an embodiment, two ends of the first track are provided with a plurality of first stop portions corresponding to the first ball retainer, respectively. The middle rail is provided with second stop portions at front, middle and rear sections thereof corresponding to the pair of second ball retainers. The inner rail is provided with third stop portions at front, middle and rear sections thereof corresponding to the pair of second ball retainers. The stop portions are configured to prevent the ball retainers from being excessively moved, so that the middle rail, the inner rail, the first ball retainer, and the second ball retainers won't disengage from each other when pulled.

Preferably, one side of each second ball retainer is provided with a notch portion corresponding to an extending direction of the second tracks so that the second tracks are received therein. The second rollers and the second balls are disposed on upper and lower sides of the notch portion, respectively.

Preferably, the first rollers, the second rollers, and the second balls are spaced and arranged corresponding to an extending direction of the multi-rail concealed slide rail structure.

DESCRIPTION OF THE PREFERRED EMBODIMENTS

The above and other objects, features and advantages of this disclosure will become apparent from the following detailed description taken with the accompanying drawings.

Figure 1:
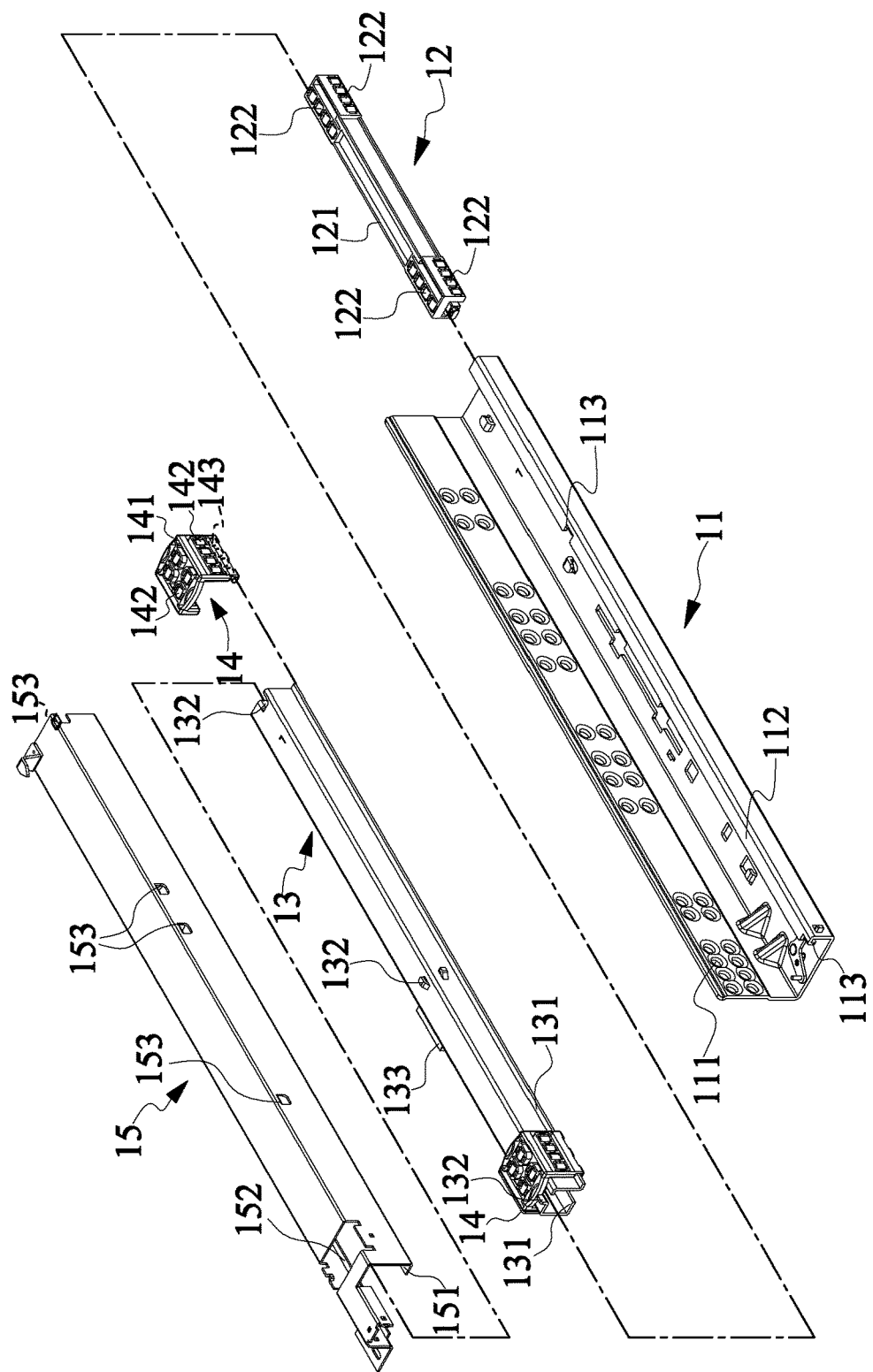
FIG. 1 is an exploded view in accordance with a preferred embodiment of the present invention.
Figure 2:
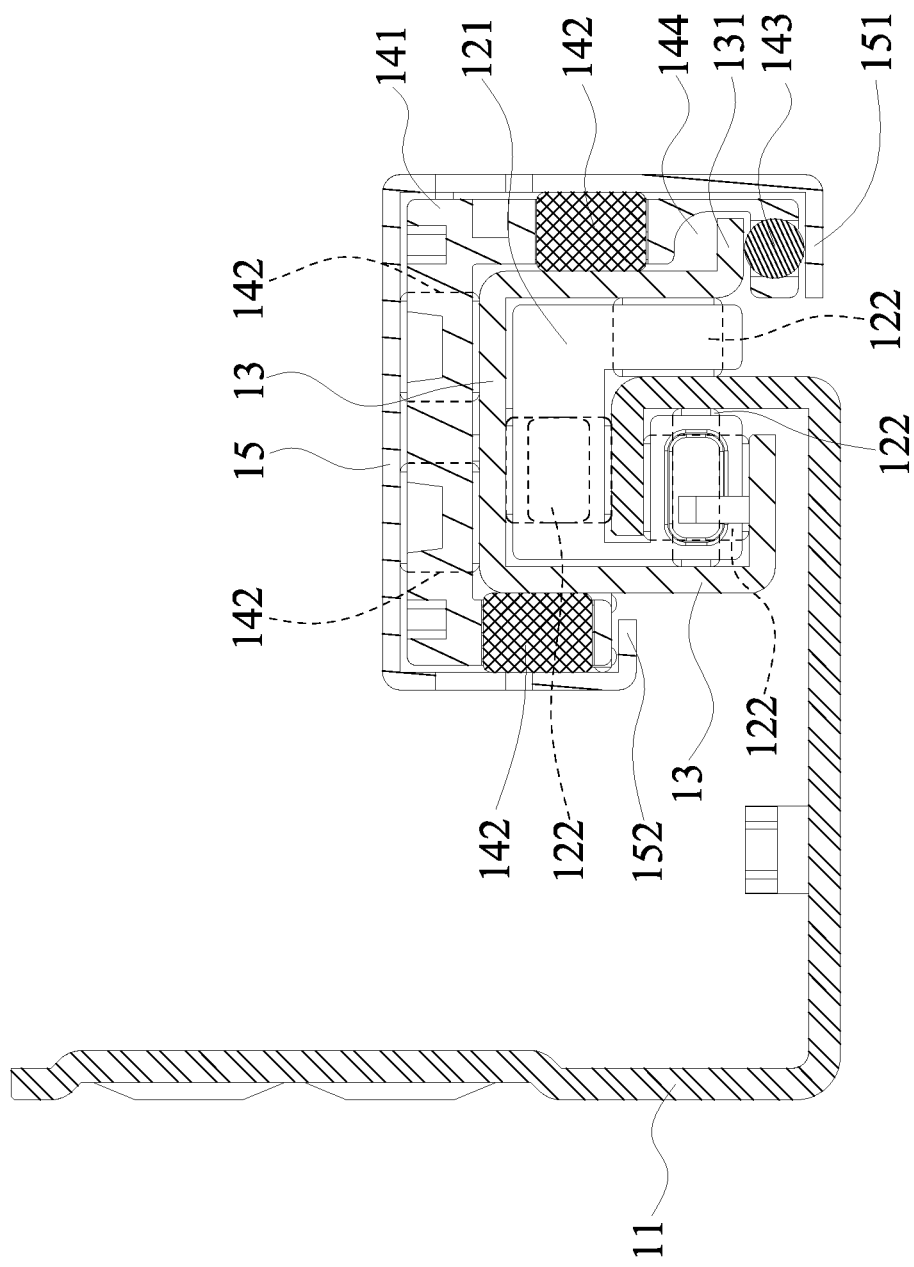
FIG. 2 is a sectional view in accordance with the preferred embodiment of the present invention after assembled.
Figure 3:
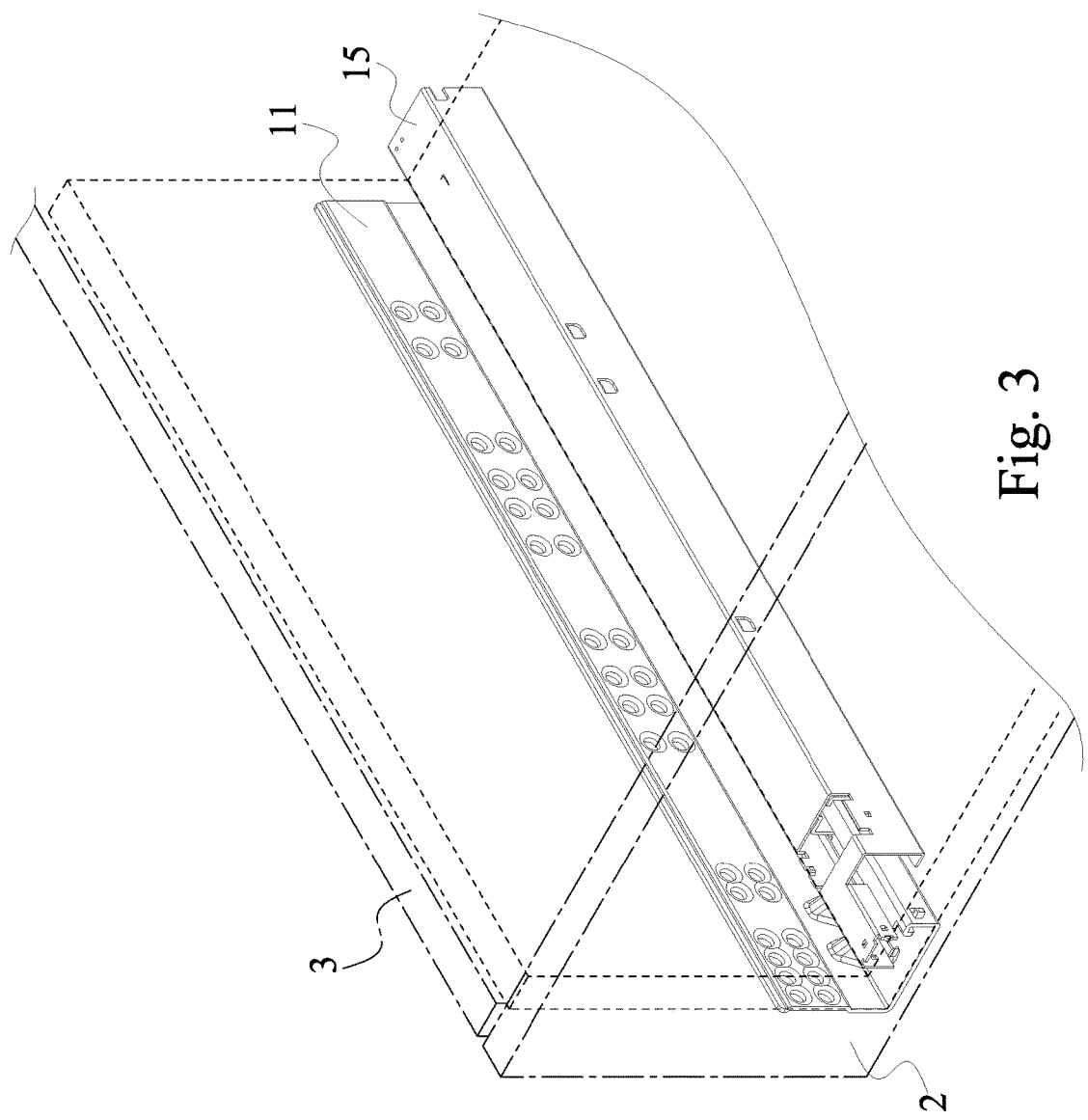
FIG. 3 is a perspective view in accordance with the preferred embodiment of the present invention after mounted.
Figure 4:
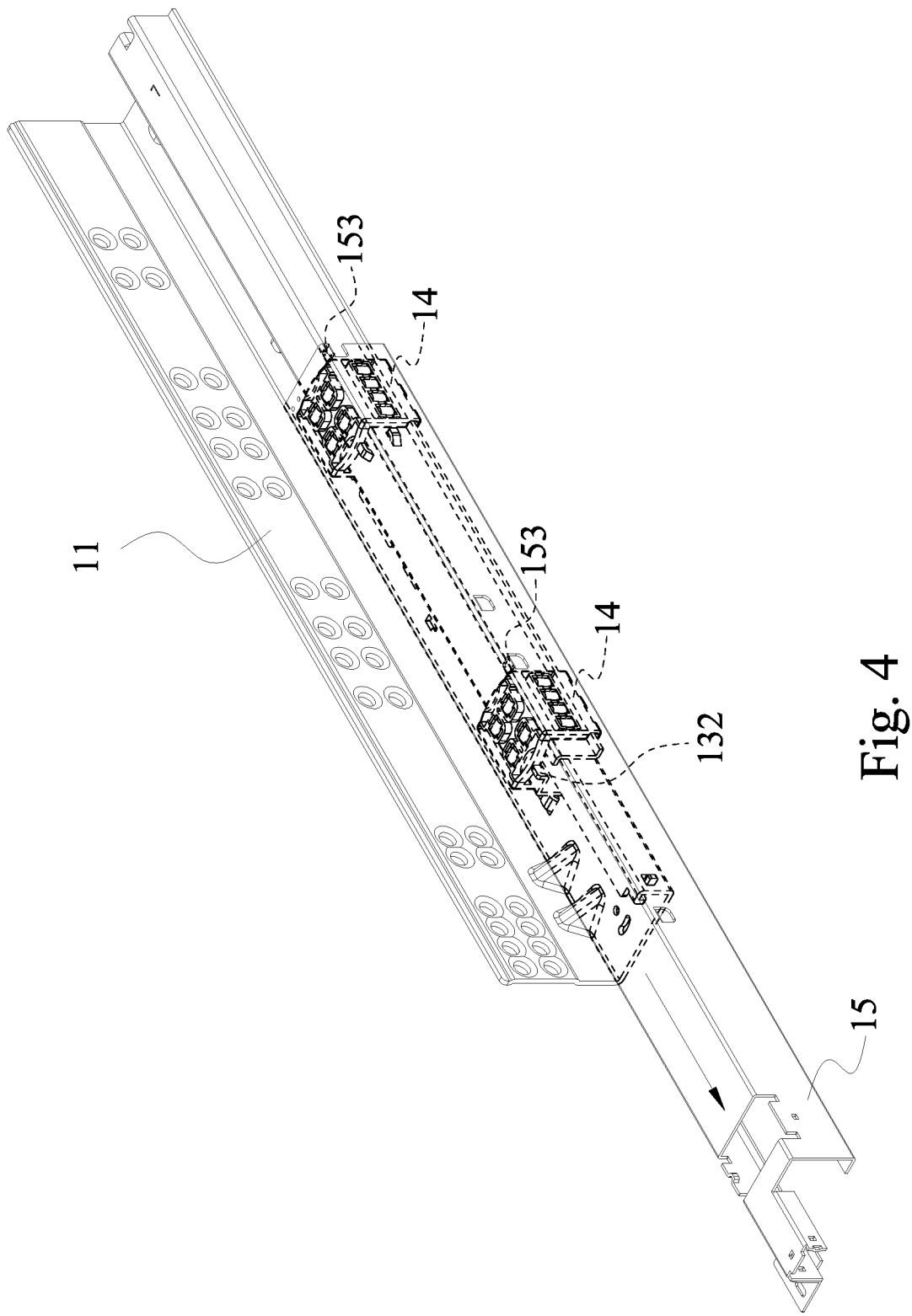
FIG. 4 is a first schematic view in accordance with the preferred embodiment of the present invention when pulled outward for use.
Figure 5:
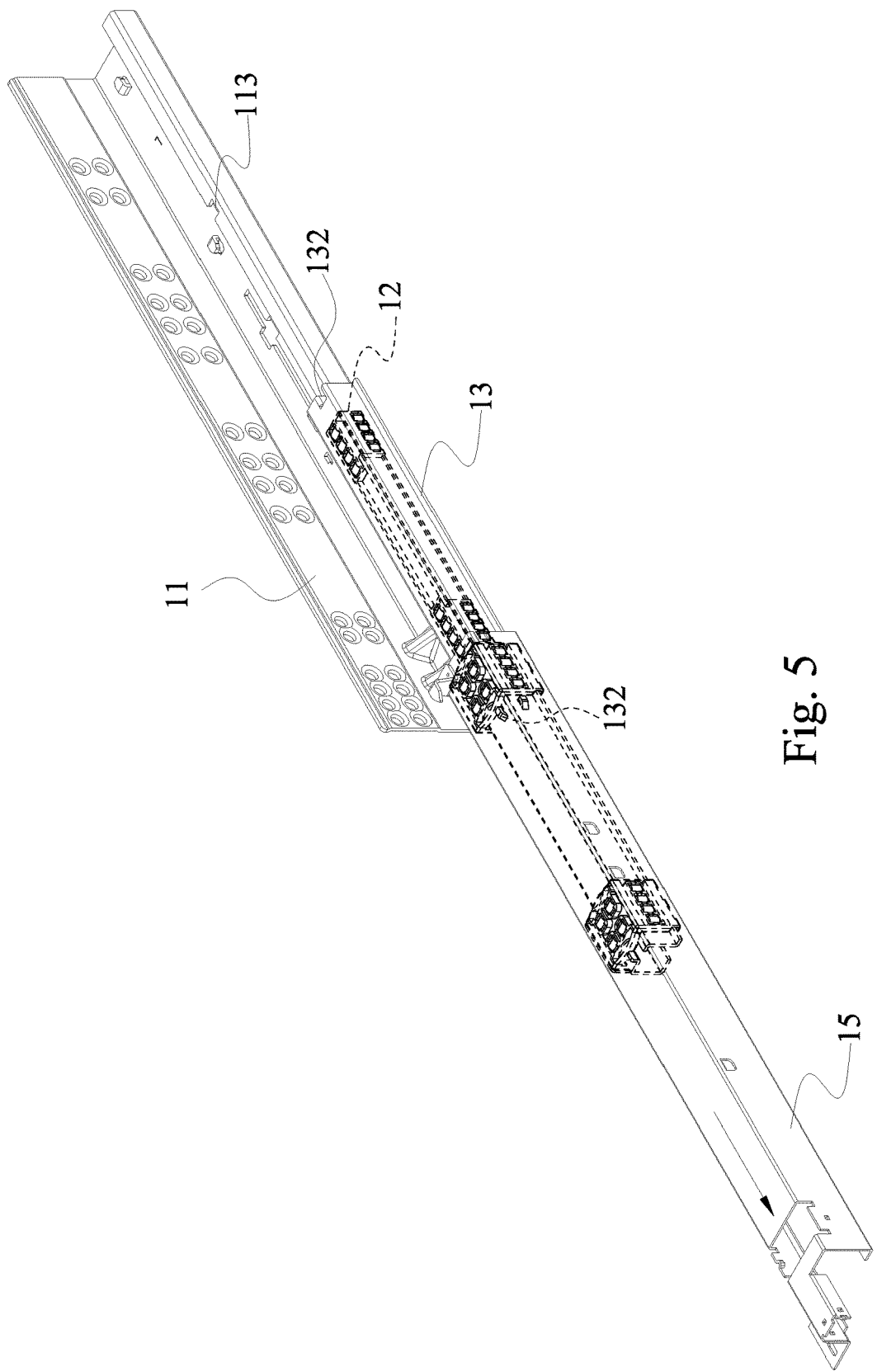
FIG. 5 is a second schematic view in accordance with the preferred embodiment of the present invention when pulled outward for use.

FIG. 1 is an exploded view in accordance with a preferred embodiment of the present invention. FIG. 2 is a sectional view in accordance with the preferred embodiment of the present invention after assembled. FIG. 3 is a perspective view in accordance with the preferred embodiment of the present invention after mounted. FIG. 4 and FIG. 5 are schematic views in accordance with the preferred embodiment of the present invention when pulled outward for use. As shown in the drawings, the present invention discloses a multi-rail concealed slide rail structure 1. The multi-rail concealed slide rail structure 1 comprises an outer rail 11, a first ball retainer 12, a middle rail 13, a pair of second ball retainers 14, and an inner rail 15. The multi-rail concealed slide rail structure is mounted to two sides of the bottom surface of a drawer 2 connected to a predetermined space of a piece of furniture 3.

The outer rail 11 of the present invention is an elongated structure having an L-shaped cross section. One side of the outer rail 11 is provided with a plurality of mounting holes 111 for mounting the outer rail 11 to a retaining surface of the furniture 3 (the retaining surface may be the inner side surface of the furniture 3 at an appropriate position). Another side edge of the outer rail 11 vertically extends upward and is bent inward to form a first track 112.

The first ball retainer 12 includes a first holder 121 which is formed in a G-like shape corresponding to the first track 112. A plurality of first rollers 122 are provided on each surface of the first holder 121. In this embodiment, the first holder 121 is formed with four mounting surfaces for mounting the first rollers 122. The upper and lower mounting surfaces are parallel to each other. The upper mounting surface is connected to and perpendicular to the side mounting surface. The first ball retainer 12 is fitted on the first track 112, such that the first rollers 122 of the top surface, the bottom surface and the two side surfaces of the first ball retainer 12 lean against four surfaces of the first track 112. The front end and the rear end of the first track 112 are provided with a pair of first stop portions 113 corresponding to the first ball retainer 12, respectively. The pair of first stop portions 113 is formed in a downward bent manner for blocking the front end of the bottom mounting surface of the first holder 121.

The middle rail 13 is an elongated structure having a reverse U-shaped cross section corresponding to the first ball retainer 12. Two side edges of the middle rail 13 are bent in the same direction to form second tracks 131, respectively. The middle rail 13 is fitted on the first ball retainer 12 so that the first rollers 122 on the bottom surface of the first ball retainer 12 leans against the second track 131 at the inner side of the middle rail 13. The central portion and another side surface of the middle rail 13 lean against the first rollers 122 on the top surface and one side surface of the first ball retainer 12, respectively. Furthermore, a limit plate 133 is provided at one side of the second track 131. The limit plate 133 is spaced from the second track 131 in order to prevent the inner rail 15 from tilting upward.

Each of the second ball retainers 14 includes a second holder 141 which is formed in a reverse U-like shape corresponding to the middle rail 13. A plurality of second rollers 142 and balls 143 are provided on each surface of the second holder 141. The pair of second ball retainers 14 is located corresponding to a front section and a rear section of the middle rail 13 respectively, so that the second rollers 142 lean against the two side surfaces and the top surface of the middle rail 13, respectively. One side of each second ball retainer 14 is provided with a notch portion 144 corresponding to the extending direction of the second track 131, so that the second rollers 142 and the second balls 143 are disposed on the upper and lower sides of the notch portion 144, respectively. The middle rail 13 is provided with second stop portions 132 at the front, middle and rear sections thereof corresponding to the pair of second ball retainers 14. The second stop portions 132 located at the front and middle sections of the middle rail 13 are bent upward, and the second stop portion 132 located at the rear section of the middle rail 13 is bent downward.

The inner rail 15 is an elongated structure having a reverse U-shaped cross section corresponding to the pair of second ball retainers 14. Two side edges of the inner rail 15 are bent inward to form third tracks 151 corresponding to the second tracks 131, respectively. The inner rail 15 is provided with a reversed bent portion 152 corresponding to the pair of second ball retainers 14. The inner rail 15 is fitted on the pair of second ball retainers 14 so as to completely cover the pair of second ball retainers 14. The top surface and two side surfaces of the inner rail 15 lean against the second rollers 142 on the top surface and two side surfaces of the pair of second ball retainers 14, respectively. The second balls 143 at the bottom surfaces of the pair of second ball retainers 14 are sandwiched between the second tracks 131 and the third tracks 151. The front, middle and rear sections of the inner rail 15 are provided with third stop portions 153 corresponding to the pair of second ball retainers 14, respectively.

The first rollers 122, the second rollers 142, and the second balls 143 are spaced and arranged corresponding to the extending direction of the multi-rail concealed slide rail structure 1. When in use, the middle rail 13 and the inner rail 15 are pulled outward in sequence. During the pull process, the second balls 143 between the second tracks 131 and the third tracks 151 serve as the main support and auxiliary slide elements for the inner rail 15. The other side of the multi-rail concealed slide rail structure 1 is formed with four parallel moving tracks. Compared to the prior art that uses the second rollers 142 located on the top surface of the middle rail 13 for sliding, the movement of the slide rail structure of the present invention is smoother and does not shake.

Further, the inner rail 15 completely covers the pair of second ball retainers 14. This design improves the protective effect effectively.

While the invention has been described by means of specific embodiments, numerous modifications and variations could be made thereto by those skilled in the art without departing from the scope and spirit of the invention set forth in the claims.

What is claimed is:

1. A multi-rail concealed slide rail structure, comprising:
an outer rail, being an elongated structure having an L-shaped cross section, one side of the outer rail being mounted to a retaining surface, another side of the outer rail being bent inward to form a first track;
a first ball retainer, including a first holder which is formed in a G-like shape corresponding to the first track, a plurality of first rollers being provided on each surface of the first holder, the first ball retainer being fitted on the first track, the first rollers of a top surface, a bottom surface and the two side surfaces of the first ball retainer lean against four surfaces of the first track;
a middle rail, being an elongated structure having a reverse U-shaped cross section corresponding to the first ball retainer, two side edges of the middle rail being bent in the same direction to form second tracks respectively, the middle rail being fitted on the first ball retainer, the first rollers on the bottom surface of the first ball retainer leaning against one of the second tracks, a central portion and two side surfaces of the middle rail leaning against the first rollers on the top surface and the two side surfaces of the first ball retainer respectively, a limit plate being provided at one side of one of the second tracks, the limit plate being spaced from the second track;
a pair of second ball retainers, the pair of second ball retainers each including a second holder which is formed in a reverse U-like shape corresponding to the middle rail, the pair of second ball retainers being located corresponding to a front section and a rear section of the middle rail respectively, the pair of second rollers of the second holder leaning against two side surfaces and a top surface of the middle rail respectively; and
an inner rail, characterized in that the inner rail is an elongated structure having a reverse U-shaped cross section corresponding to the pair of second ball retainers, two side edges of the inner rail are bent inward to form third tracks corresponding to the second tracks respectively, the pair of second ball retainers comprises a pair of second rollers and a set of second balls, wherein the set of second balls is provided on a surface of one end of the second holder, the inner rail is provided with a reversed bent portion corresponding to the pair of second ball retainers, the inner rail is fitted on the pair of second ball retainers, a top surface and two side surfaces of the inner rail lean against the pair of second rollers on a top surface and two side surfaces of the pair of second ball retainers respectively, the set of second balls at respective bottom surfaces of the pair of second ball retainers are sandwiched between the second tracks and the third tracks, the limit plate being configured to prevent the inner rail from tilting upward.

2. The multi-rail concealed slide rail structure as claimed in claim 1, wherein a front end and a rear end of the first track are provided with first stop portions corresponding to the first ball retainer, respectively.

3. The multi-rail concealed slide rail structure as claimed in claim 1, wherein the middle rail is provided with second stop portions at front, middle and rear sections thereof corresponding to the pair of second ball retainers.

4. The multi-rail concealed slide rail structure as claimed in claim 1, wherein the inner rail is provided with third stop portions at front, middle and rear sections thereof corresponding to the pair of second ball retainers.

5. The multi-rail concealed slide rail structure as claimed in claim 1, wherein one side of each second ball retainer is provided with a notch portion corresponding to an extending direction of the second tracks, and the pair of second rollers and the set of second balls are disposed on upper and lower sides of the notch portion, respectively.

6. The multi-rail concealed slide rail structure as claimed in claim 1, wherein the first rollers, the pair of second rollers, and the set of second balls are spaced and arranged corresponding to an extending direction of the multi-rail concealed slide rail structure.

* * * * *